Figure 1:
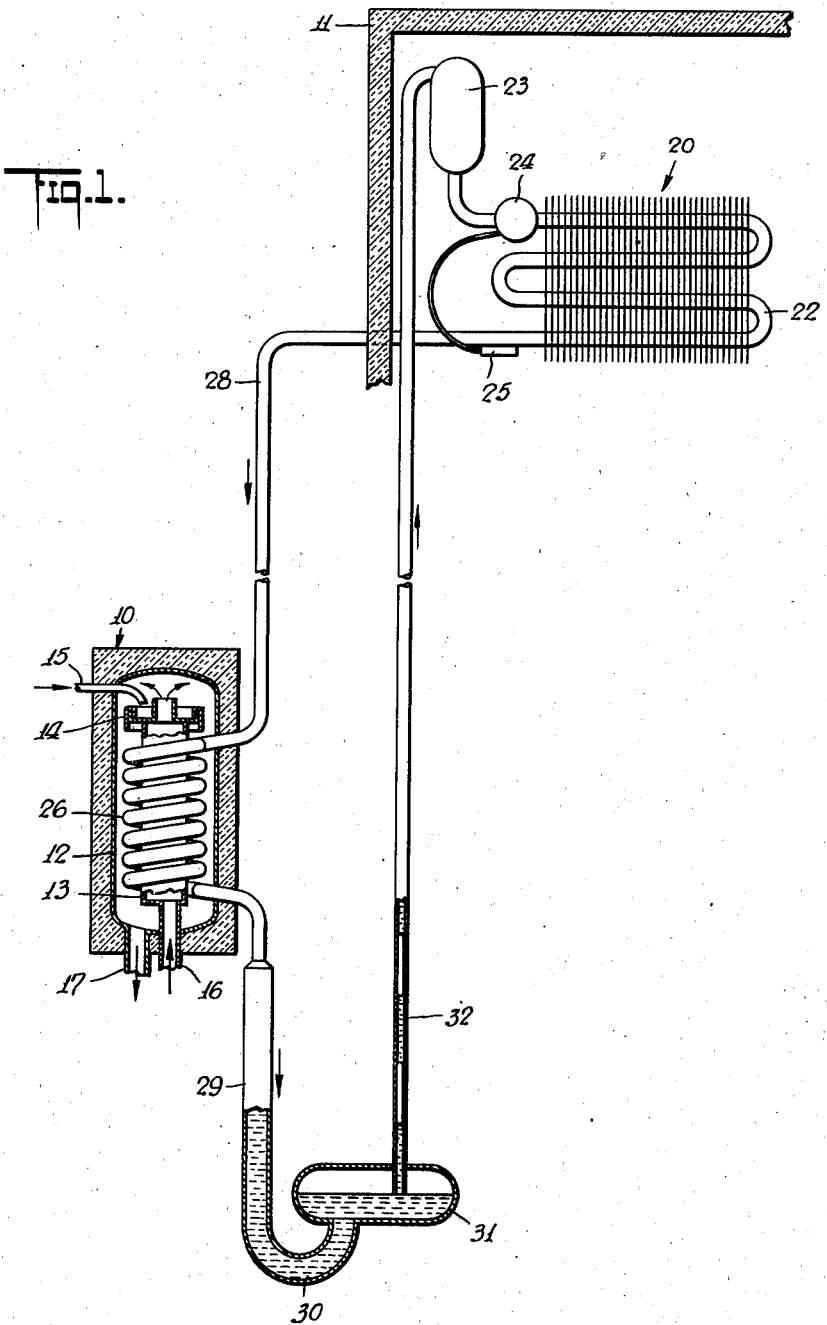

July 10, 1945. J. DAVIDSON 2,380,029
REFRIGERATION
Filed July 5, 1940 2 Sheets-Sheet 2
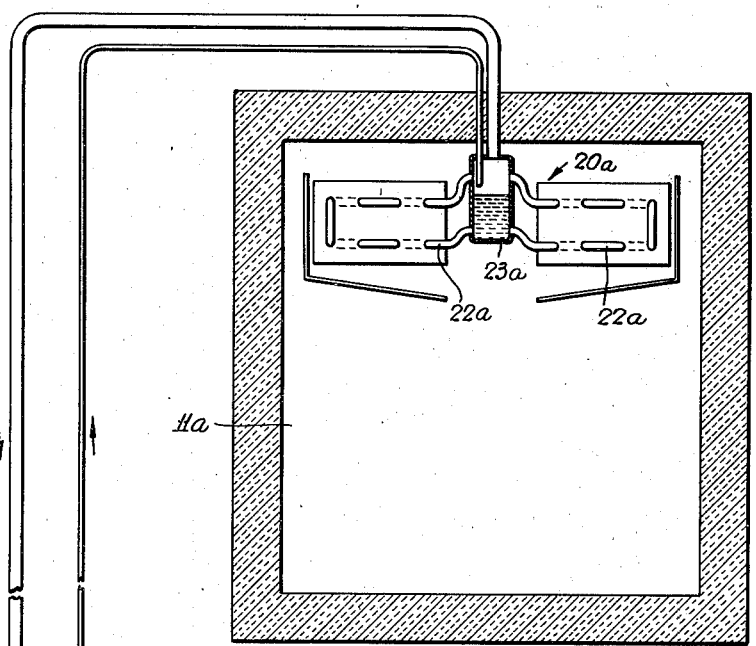
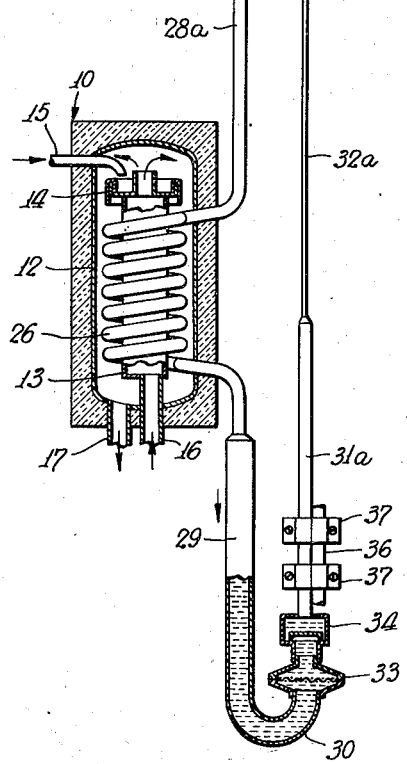
Fig. 2.
INVENTOR.
John Davidson
BY D.E. Heath
his ATTORNEY.

Patented July 10, 1945

2,380,029

UNITED STATES PATENT OFFICE 2,380,029

REFRIGERATION

John Davidson, Evansville, Ind., assignor to Servel, Inc., New York, N. Y., a corporation of Delaware Application July 5, 1940, Serial No. 343,941

1 Claim. (Cl. 62—125)

This invention relates to refrigeration, and more particularly to a system for transferring heat to effect cooling at a region above a source of refrigeration.

It is an object of the present invention to provide a heat transfer fluid composition which is capable of improved vapor liquid lift action.

I have discovered that the vapor lift action of a volatile heat transfer fluid such as methyl chloride or freon is greatly improved by the presence of a small quantity of an agent having the property of increasing the viscosity of the resultant liquid, or the property of increasing the frothing and bubbling of said liquid. This agent is desirably miscible in the heat transfer fluid in order to assure circulation or return of said agent with the fluid vapor.

I have also discovered that the presence of such an agent in sufficient quantity to materially increase the lift action of the fluid does not affect the refrigerating properties of the fluid. I have found oil, such as mineral oil, to be a suitable agent for this purpose, and as a specific example I have determined that advantageous results can be obtained with a composition comprising a volatile liquid refrigerant such as methyl chloride and about 3 per cent by volume of industrial white oil.

This composition may be used in systems shown in the accompanying drawings, of which:

Fig. 1 shows more or less diagrammatically a cooling system embodying the invention; and Fig. 2 similarly shows a modification of the system in Fig. 1.

Referring to Fig. 1, a primary refrigerating system has an evaporator or cooler unit 10 which is located remotely below a heat insulated region or chamber 11 to be refrigerated, and which constitutes a source of refrigeration for said chamber. This primary refrigerating system may be of any suitable type, as for instance a uniform pressure absorption type like that described in Patent No. 2,207,838 of A. R. Thomas. In the primary evaporator unit, a cylinder 13 is enclosed in a heat insulated shell 12 and is provided at its upper end with an annular tray 14 into which is delivered a suitable liquid refrigerant such as ammonia through a pipe 15. The ammonia is distributed from the tray 14 and flows downward over coil 26. Inert gas such as hydrogen enters the evaporator 10 through pipe 16 and cylinder 13. The liquid ammonia on coil 26 evaporates and diffuses into the hydrogen, producing a refrigerating effect for cooling coil 26. The mixture of ammonia vapor and hydrogen flows from the shell 12 through the pipe 17, and is processed as described in the above patent for separate cyclic return of these fluids to their respective inlets 15 and 16.

A system for transferring heat from the storage chamber 11 to the primary evaporator 10 includes a secondary evaporator unit 20 disposed in said chamber. Evaporator 20 comprises a finned coil 22 having its upper end connected to a receiver 23. A valve 24 is connected between tank 23 and coil 22. Valve 24 is thermostatically operated responsive to temperature at the lower outlet end of coil 22 where a thermostat bulb 25 is located.

The evaporator 20 is connected to coil 26 forming therewith a closed fluid circuit containing my new composition described above. Cooling of the condenser coil 26 by the action of the primary evaporator unit 10 will cause evaporation of liquid in the evaporator 20 and resultant cooling of the storage chamber 11. Vapor flows from evaporator 20 to the condenser coil 26 where it is cooled and condensed to liquid.

Condensed liquid flows by gravity from the condenser 26 through a pipe 29 having a trap 30 into a lift chamber 31 and the lower end of a lift conduit 32. Chamber 31 is heated by any suitable means to vaporize the liquid refrigerant therein. The entire liquid line from evaporator 10 to box 11 is thermally insulated, though not so illustrated for sake of clarity. By omitting insulation around chamber 31 it will be heated by atmosphere. Vapor formed in chamber 31 bubbles into liquid in the lower end of conduit 32 and in known manner the vapor and liquid column rises in conduit 32 so that liquid is lifted into vessel 23. Vapor and liquid pass from vessel 23 into evaporator coil 22 where the liquid evaporates to cool box 11. Vapor flows from coil 22 through conduit 28 to the condenser coil 26. Valve 24 is normally open and arranged to close when liquid flows from the lower end of coil 22. This is known as a frost back prevention valve.

In Fig. 2 is shown a heat transfer system comprising an evaporator unit 20a disposed in a storage chamber 11a of a walk-in cooler or similar equipment and which has a plurality of finned coils 22a supplied from a header 23a. The condenser coil 26 forms with the evaporator 20a a closed fluid circuit containing my new composition and is disposed below said evaporator as in the case of the system shown in Fig. 1 and has its inlet end connected to the header 23a by a vapor line 28a.

Liquid flows by gravity from the condenser 26 through pipe 29, trap 30, a filter 33, and a check valve 34 into a tube 31a. The upper end of tube 31a is connected by the riser or lift pipe 32a to the header 23a. Applied to the tube 31a is a heat conductor 36 shown in the form of a pipe mounted in heat exchange relationship with said tube by suitable means as for instance clamps 37, and serving to conduct a heating fluid therethrough. This heating fluid may be outlet condenser water from the primary refrigerating system associated with the primary evaporator unit 10. Though not so shown for the sake of simplicity, the entire liquid line from evaporator 10 to box 11a should be thermally insulated.

Heating of liquid in the tube 31a causes generation of vapor therein to lift the liquid through the riser or lift pipe 32a into the evaporator header 23a.

The oil or similar agent which functions in the systems of Figs. 1 and 2 to change the viscosity of the operating liquid and/or increase the bubbling or frothing of said liquid during vapor lift action, serves to impart to the volatile liquid refrigerant a much greater lift during such action than is possible without the presence of this agent, and effects this very advantageous result without any appreciable detrimental effect upon the refrigerating properties of this operating liquid and also effects steady operation of the system and prompt starting from a shut-down condition.

Various changes and modifications may be made within the scope of the invention as set forth in the following claim.

What is claimed is:

A closed heat transfer system devoid of any moving part requiring a lubricant miscible with liquid in the system, flow of the liquid being promoted by a bubble type gas lift, and the liquid containing a minor percentage of oil which increases viscosity and, therefore, frothing and bubbling of the liquid during action of the lift to increase the efficiency of such action.

JOHN DAVIDSON.